United States Patent
Scheer

(10) Patent No.: US 11,004,326 B2
(45) Date of Patent: May 11, 2021

(54) SYSTEM AND METHOD FOR MONITORING A LOCATION

(71) Applicant: JOHNSON CONTROLS SECURITY SOLUTIONS LLC, Boca Raton, FL (US)

(72) Inventor: William Louis Scheer, Coral Springs, FL (US)

(73) Assignee: Johnson Controls Security Solutions LLC, Boca Raton, FL (US)

( * ) Notice: Subject to any disclaimer, the term of this patent is extended or adjusted under 35 U.S.C. 154(b) by 0 days.

(21) Appl. No.: 16/292,551

(22) Filed: Mar. 5, 2019

(65) Prior Publication Data

US 2019/0197874 A1 Jun. 27, 2019

Related U.S. Application Data

(63) Continuation of application No. 13/422,085, filed on Mar. 16, 2012, now abandoned.

(51) Int. Cl.
*G08B 25/00* (2006.01)
*H04L 29/08* (2006.01)

(52) U.S. Cl.
CPC ............ *G08B 25/006* (2013.01); *H04L 67/10* (2013.01); *H04L 67/12* (2013.01)

(58) Field of Classification Search
CPC .............. G08B 25/006; G08B 13/1965; G08B 13/1966; G08B 25/009; G08B 25/10; G08B 13/00; G08B 25/004; G08B 1/08; G08B 13/22; B60R 2025/1016; H04L 67/12; H04L 67/025; H04L 51/18; H04L 67/10; G07C 2209/62; Y10T 70/5155
See application file for complete search history.

(56) References Cited

U.S. PATENT DOCUMENTS

| | | | |
|---|---|---|---|
| 8,779,921 B1* | 7/2014 | Curtiss | G08B 25/009 340/506 |
| 2008/0180241 A1* | 7/2008 | Hess | G08B 13/1965 340/539.11 |
| 2010/0060414 A1* | 3/2010 | Im | G07C 9/23 340/5.54 |
| 2013/0120134 A1* | 5/2013 | Hicks, III | G08B 25/004 340/501 |

* cited by examiner

*Primary Examiner* — Muhammad Raza
(74) *Attorney, Agent, or Firm* — Arent Fox LLP

(57) ABSTRACT

A system for monitoring a location may include a local agent device at the location, and at least one sub-system at the location. The sub-system(s) is in communication with the local agent device. The local agent device is configured to detect and automatically respond to a first event occurring at or within the sub-system(s) according to a first procedure. The local agent device is configured to contact a monitoring center that is remotely located from the location when the local agent device detects a second event occurring at or within the sub-system(s) according to a second procedure.

11 Claims, 5 Drawing Sheets

SYSTEM AND METHOD FOR MONITORING A LOCATION

RELATED APPLICATIONS

This application is a continuation of U.S. patent application Ser. No. 13/422,085, filed Mar. 16, 2012, which is hereby incorporated by reference in its entirety.

BACKGROUND OF THE INVENTION

Embodiments generally relate to a system and method of monitoring a location, such as a business or home.

Various companies utilize surveillance and alarm systems to protect their businesses. Surveillance devices may generally include video equipment, still image cameras, motion-monitoring equipment, temperature sensors, water sensors, and the like that collect data (video, images, etc.) for storage in a database or a digital video recorder (DVR). For example, many businesses utilize security alarm systems that, upon detection of a break-in of the premises, immediately contact a remote monitoring center.

Typically, large enterprises have multiple systems and devices that constantly monitor enterprise operations. Generally, when an alarm or alert is detected by a typical monitoring system, a monitoring center staffed with monitoring personnel is contacted to address the alarm or alert. Large companies that are able to draw on great resources generally are able to employ the technology, capital, and management necessary to establish around-the-clock alarm monitoring and response operations.

Many small to mid-size companies, however, lack the resources to employ staff that monitors premises and infrastructure all the time. That is, while many large companies are able to employ staff to monitor the business twenty-four hours a day, three hundred sixty-five days a year, many small to mid-size companies are not able to afford to do so. While many companies have multiple systems and devices that monitor operation of the business, they often lack the resources to monitor and respond to the various issues during hours when the business is closed, for example.

BRIEF DESCRIPTION OF THE INVENTION

Embodiments provide a system and method of monitoring a location. The system and method may include a local agent device that automatically responds to and resolves various alarms or alerts.

Certain embodiments provide a system for monitoring a location, such as a business or home. The system may include a local agent device, such as a local agent server, at the location, and at least one sub-system at the location. The sub-system(s) is in communication with the local agent device. The local agent device is configured to detect and automatically respond to and resolve a first event occurring at or within the sub-system(s) according to a first procedure. The local agent device is also configured to contact a monitoring center that is remotely located from the location when the local agent device detects a second event occurring at or within the sub-system(s) according to a second procedure. The local agent device may not contact the remote monitoring center when the first event is detected.

The local agent device may include a server. The server may include a housing configured to be positioned on or underneath a desk at the location. The server may be adapted to be fully integrated with existing infrastructure of the sub-system(s).

The sub-system(s) may include one or more of a business sub-system, a home sub-system, a video monitoring sub-system, a card access sub-system, or a security sub-system.

The first event may include an alarm event that is pre-defined and stored within the local agent device. The alarm event may relate to a standard issue that may be efficiently resolved by personnel at the location (in contrast to staff at a remote monitoring center).

The second event may include an emergency event that is pre-defined and stored within the local agent device. The emergency event may relate to a non-standard, emergency issue that is not readily resolved by personnel at the location. For example, the emergency issue may be a security breach, or damage to a business device that requires a repair service to address.

The first procedure may include the local agent device sending an email to an individual associated with the location. The email may indicate a standard issue with a sub-system and instructions on how to remedy the standard issue. For example, the email may indicate that a printer is out of ink, and that the depleted ink cartridge should be replaced.

The second procedure may include the local agent device sending an alert to the monitoring center. The alert prompts personnel at the monitoring center to take further action. The second procedure may relate to an emergency issue. The personnel at the monitoring center may proceed according to a pre-configured action response plan. For example, the emergency issue may relate to a security breach after hours. The action response plan may prompt the personnel at the monitoring center to contact the police, and then call and email one or more contact persons associated with the monitored location.

One or both of the local agent device and the monitoring center may generate an incident report of the first or second event. One or both of the local agent device and the monitoring center may then send the incident report to an individual associated with the location.

The local agent may include a control block having a processor in communication with a memory and a database. The first and second procedures may be stored in the memory. The processor may be configured to store incident reports in the database.

Certain embodiments provide a system for monitoring a location that may include a plurality of sub-systems at a first location, a local agent device at the first location, and a monitoring center at a second location that is separate, distinct, and remote from the first location. The local agent device is in communication with each of the sub-systems. The local agent device is configured to detect and automatically respond to one or more first events occurring at or within the plurality of sub-systems according to first procedures. The local agent device is configured to contact the monitoring center that is remotely located from the first location when the local agent device detects one or more second events occurring at or within the plurality of sub-systems according to second procedures.

Certain embodiments provide a method of monitoring a location. The method may include communicatively connecting a plurality of sub-systems at a first location to a local agent device at the first location, monitoring the sub-systems with the local agent device. detecting a first event at or within one of the sub-systems with the local agent device at the first location, automatically responding, with the local agent device at the first location, to the first event at or within one of the subsystems according to a first procedure, detecting a second event at or within one of the sub-systems with the local agent device at the first location, sending, from the local agent device, an alert regarding the second event to a monitoring center at a second location that is separate, distinct, and remote from the first location of the second events, and responding, by the monitoring center at the second location, to the second event according to a second procedure.

The method may also include generating an incident report of the second event, and sending the incident report to an individual associated with the first location.

DETAILED DESCRIPTION OF THE INVENTION

In accordance with embodiments, systems and methods are provided that afford real time "in the cloud" managed data. Cameras and other surveillance devices may be positioned throughout a monitored location. A network may be created to connect the surveillance devices and business devices and machines to a central, single local agent device from which real time events are managed. The network may be changed constantly, and accordingly, the systems and methods provided herein enable such changes to be documented easily. The systems and methods provided herein may also ensure centralized control over changes to the network and to the documentation describing network changes. The systems and methods provided herein gather data for every architectural layer and enable input of such data to a common storage and provide search tools that are able to readily and quickly search the storage for desired information. The systems and methods provided herein afford administrative controls over the documentation to avoid mistakes.

Figure 1:
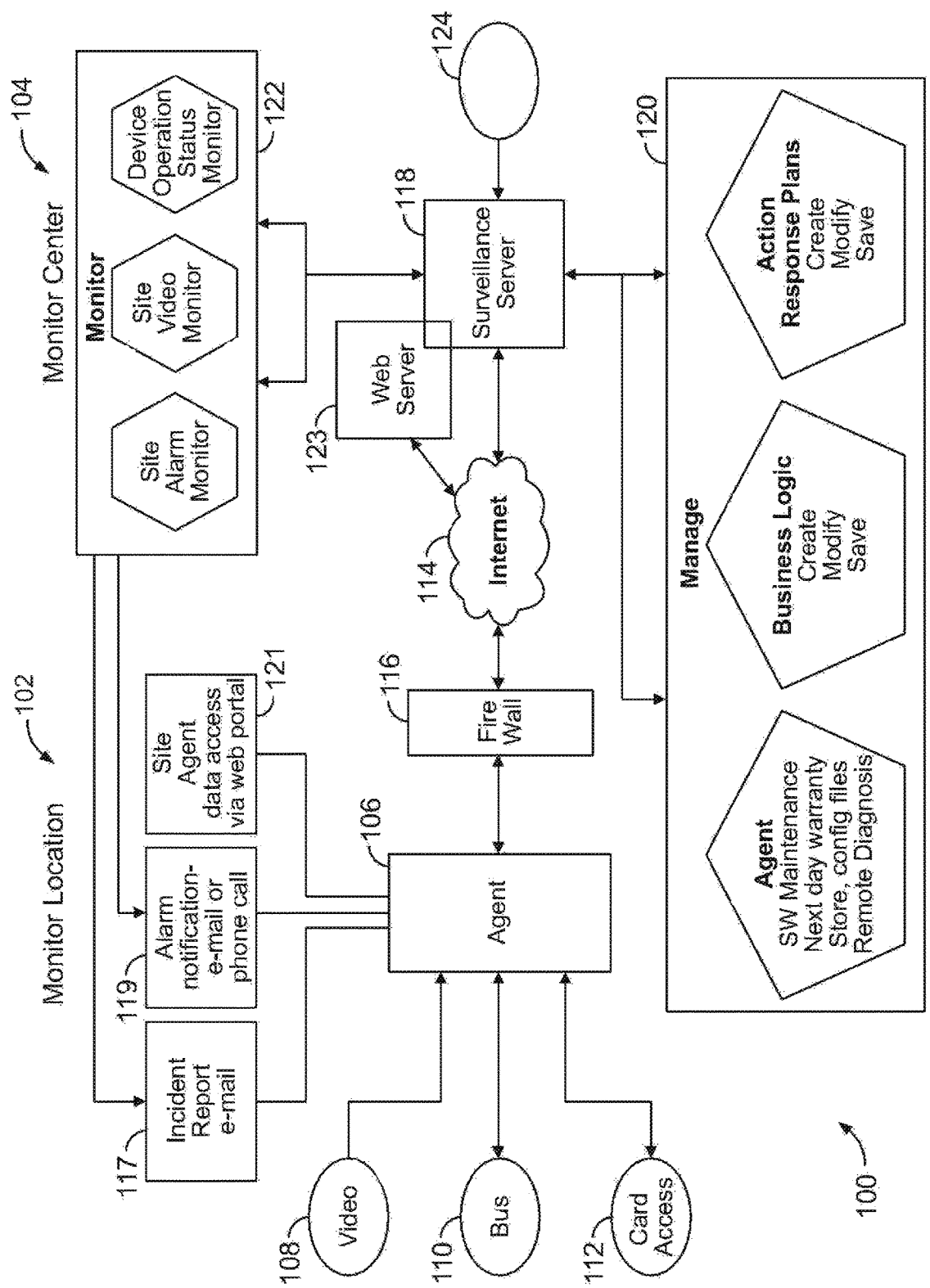
FIG. 1 illustrates a block diagram of a site monitoring system, according to an embodiment.

FIG. 1 illustrates a block diagram of a site monitoring system 100, according to an embodiment. The system 100 includes a monitored location 102 in communication with a remote monitoring center 104. The monitored location 102 may be a business enterprise, such as an outpatient medical clinic, a restaurant, a legal office, a bank, or various other businesses, or a home. The remote monitoring center 104 may be a facility that is remotely located from the monitored location 102 and that may be configured to bi-directionally communicate with the monitored location 102.

The monitored location 102 includes a local agent device 106 that is in communication with various sub-systems 108, 110, and 112 of the monitored location 102. For example, the local agent device 106 may be in communication with a video monitoring sub-system 108, various business or home sub-systems 110, and a card access sub-system 112. In addition to the video monitoring and card access sub-systems 108 and 112, the local agent device 106 may also be in communication with still image cameras, motion monitoring equipment, temperature sensors, water sensors and the like that collect data (video, images, etc.) for storage in a database or a digital video recorder (DVR), for example.

Each business sub-system 110 may include various devices, systems, or the like within a particular business. For example, if the business is a medical facility, the business sub-systems 110 may include imaging systems, such as ultrasound, magnetic resonance imaging (MRI), fluoroscopic, computerized tomography (CT), or the like, imaging systems. The business sub-systems 110 may also include drug cabinets, for example. If the business is a restaurant, for example, the business sub-systems 110 may include freezers, refrigerators, or the like. If the business is a bank, the business sub-systems 110 may include a vault, electronic databases, and the like. The business sub-systems 110 may also include heating, air conditioning, and ventilation systems, for example. In general, the business sub-systems 110 may be any systems, components, devices, that are used with respect to a particular enterprise or business.

Additionally, in the medical context, the business sub-systems 110 may include various medical devices such as sterilizers, defibrillators, anesthesia machines and monitors, vital sign monitors, oxygen cylinders, emergency drug kits, narcotics lockers, medication refrigerators, IV pumps, and automated drug dispensation systems.

The local agent device 106 is configured to monitor the various sub-systems 108, 110, and 112 and respond to alarms or notifications generated by the sub-systems 108, 110, and 112 in response to detected events according to pre-programmed procedures or protocols that are correlated with the events, as described below. For example, the local agent device 106 is configured to automatically respond on-site to certain non-emergency events according to a non-emergency procedure or protocol. If the local agent device 106 receives an emergency alarm detecting an emergency event from one of the sub-systems 108, 110, and 112, the local agent device 106 may contact the remote monitoring center 104. The monitored location 102 may also include an email server 117, a phone sub-system 119, and a web portal 121 in communication with the local agent device 106.

The local agent device 106 may be in communication with the monitoring center 104 through the internet 114, for example. A firewall 116 may be positioned between the local agent device 106 and the internet 114 in order to protect the local agent device 106 from non-secure and malicious electronic applications, for example, such as over the internet 114.

Alternatively, the surveillance server 118 and the web server 123 may be part of a secure, common storage medium, such as the cloud.

The remote monitoring center 104 includes a surveillance server 118 in communication with the local agent device 106. The surveillance server 118 is operatively connected and in communication with (or includes) a management sub-system 120 and a monitoring sub-system 122. The management sub-system 120 is configured to allow an individual to define, modify, and save data indicating particular events, and procedures or protocols correlating to the events. The monitoring sub-system 122 is configured to allow personnel at the monitoring center 122 to monitor alarms regarding sub-systems 108, 110, and 112 sent to the surveillance server 118 through the local agent device 106.

The monitoring center 104 may also include a web server 123 that is communication with the web portal 121 at the monitored location 102. The surveillance server 118 may also be in communication with a remote security alarm center 124 having staff that are in communication with the authorities, such as a local fire department, police department, and the like. The web server 123 may be accessible to any browser-equipped Internet accessible PC, laptop, netbook, tablet, smart phone, or the like. Access to the web server 123 may require authentication.

Figure 2:
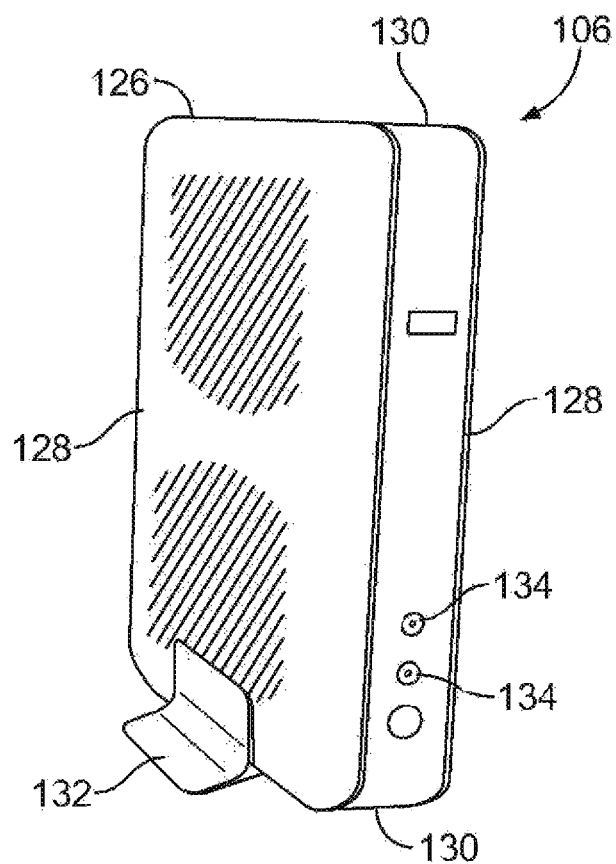
FIG. 2 illustrates an isometric view of a local agent device, according to an embodiment.

FIG. 2 illustrates an isometric view of a local agent device 106, according to an embodiment. The local agent device 106 may be a small form factor computing device, such as a server, including a main housing 126 having lateral panels 128 connected to a frame 130 and base 132. The main housing 126 includes one or more input ports 134 such as a universal serial bus (USB) port, telephone jacks, DSL inputs, Ethernet ports, and the like, for example. The local agent device 106 may be in direct communication with each of the sub-systems 108, 110, and 112, for example. Optionally, the local agent device 106 may be in electrical communication with a master computer at the monitored location 102 that is in communication with the sub-systems 108, 110, and 112.

While shown having the main housing 126, the local agent device 106 may be various other shapes and sizes. In general, the main housing 126 may be sized and dimensioned to be conveniently located at or proximate a desk within an office. For example, the local agent device 106 may be located on or underneath a desk, next to a personal or laptop computer.

The local agent device 106 may be any type of computing device having a processing unit, memory, a database, and the like, for example. As noted, the local agent device 106 may be a server, which serves the requests of other programs or client computer systems, such as those of the sub-systems 108, 110, and 112, for example. As such, the local agent device 106 may be connected to a common computing system that is also in communication with the sub-systems 108, 110, and 112, or may directly connect to the sub-systems 108, 110, and 112 through a network, such as a local area network (LAN), wide area network (WAN), a wireless local area network (WLAN), or the like, at the monitored location 102.

As noted, the local agent device 106 may be sized to fit on or underneath a desk, for example. As such, the local agent device 106 may be readily implemented into an office environment. Alternatively, the local agent device 106 may be located in a server room or data center, for example.

Figure 3:
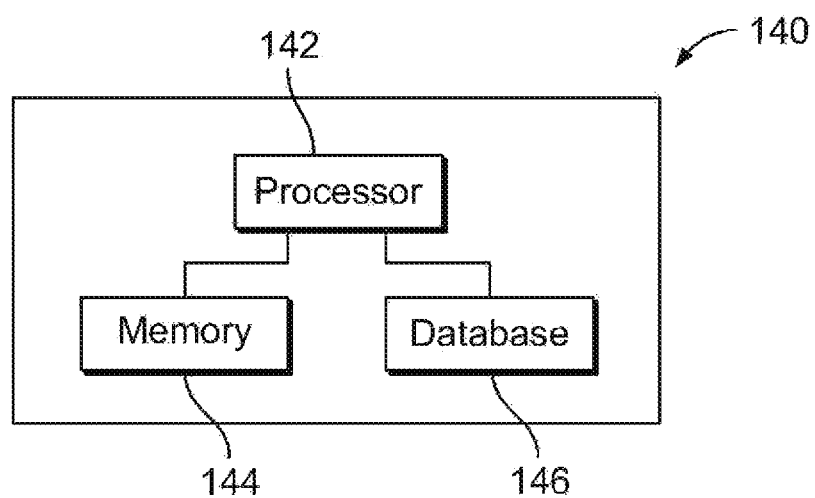
FIG. 3 illustrates a simplified block diagram of a control block of a local agent device, according to an embodiment.

FIG. 3 illustrates a simplified block diagram of a control block 140 of the local agent device 106, according to an embodiment. The control block 140 includes a processor 142 that is implemented to include all of the functionality of the local agent device 106. The processor 142 is in communication with a memory 144 and a database 146. The memory 144 is configured to store instructions for operation of the local agent device 106. The processor 142 operates the local agent deice 106 according to the instructions stored in the memory 144. The database 146 is configured to store data, such as data regarding dates and times of various alarm events, actions taken, and the like. The local agent device 106 may include server-executable instructions that may define how specified procedures are to be handle.

Control logic may be provided on an integrated circuit (IC) within or connected to the processor 142. The control logic includes various electronic components based on the desired functionality of the control block 140.

The control block 140 may include more components than those shown. Additionally, the control block 140 may include more than one processor, memory location, and database. The processor 142 may be any type of processor, microprocessor, integrated circuit, or the like used within a server, for example.

As noted above, the local agent device 106 may be or include a computer processor, controller, or other logic-based device that performs operations based on one or more sets of instructions (e.g., software). The instructions on which the local agent device 106 operates may be stored on a tangible and non-transitory (e.g., not a transient signal) computer readable storage medium, such as the memory 144. The memory 144 may include one or more computer hard drives, flash drives, RAM, ROM, EEPROM, and the like. Alternatively, one or more of the sets of instructions that direct operations of the local agent device 106 may be hard-wired into the logic of the processor 142, such as by being hard-wired logic formed in the hardware of the local agent device 106.

Referring to FIGS. 1-3, in operation, the local agent device 106 is programmed to monitor the sub-systems 108, 110, and 112 according to procedures correlated with defined events. Data regarding the procedures and defined events are stored in the memory 144. The defined events and procedures may be input directly into the local agent device 106. For example, the local agent device 106 may be part of, or connected to, a personal or notebook computer. An individual, such as a business owner, may input and store various defined events and procedures directly into the local agent device 106.

Optionally, the various defined events and procedures may be input at the management sub-system 120 of the monitoring center 104. The management sub-system 120 also includes a processing unit, memory, and the like. The management sub-system 120 may be a personal or notebook computer in communication with the surveillance server 118.

The management sub-system 120 allows an individual to enter information for the local agent device 106, such as maintenance schedules, warranty information, and remote diagnosis information. The management sub-system also allows an individual to input business logic. The business logic provides various defined events and procedures for the sub-systems 108, 110, and 112. Additionally, the management sub-system 120 allows an individual to input action and response plans for various alarms, events, and the like. The business logic and action and response plans may be accessed by the surveillance server 118, and sent to the local agent device 106 over the internet 114. The business logic and action and response plans may then be stored in the memory 144 of the local agent device 106. Optionally, as noted above, the business logic and action and response plans may be directly stored in the local agent device 106 at the monitored location 102.

The business logic and action and response plans may be created, modified, and saved at the management sub-system 120. Optionally, the business logic and action and response plans may be created, modified, and saved at the monitored location 102 and sent to the monitoring center 104 via email, the internet 114, or the like.

Business logic may include instructions for the local agent device 106 to respond and resolve standard, non-emergency events and issues at the monitored location 102 without contacting the monitoring center 104. For example, business logic may include steps for the local agent device 106 to perform if a business sub-system 110, such as a printer, experiences a standard issue, such as running out of ink. In this example, the business logic may cause the local agent device 106 to send an email or an automated telephone message to a location manager or administrator, instructing the person that the printer is out of ink, and to replace the depleted ink cartridge.

The action and response plan may be related to emergency issues. For example, if a medical imaging device is inoperable due to a malfunctioning processor, the local agent device 106 may alert the surveillance server 118 of the emergency issue, and personnel at the monitoring center 104 may follow a predetermined action and response plan that includes contacting the manufacturer, scheduling a service appointment, and contacting an administrator at the monitored location 102.

The business logic and action and response plans are examples of procedures based on defined events that instruct the local agent device 106 how to operate based on various situations. Each procedure may include operational procedures based on a standard event, an alarm event, and an emergency event, for example.

For example, a standard or alarm event or alert may prompt the local agent device 106 to operate according to a procedure in which the local agent device 106 automatically performs a task, without contacting the surveillance server 118. Optionally, an alarm event may prompt the local agent device 106 to operate according to a procedure in which the local agent device 106 automatically performs a task while also contacting the remote surveillance server 118. An emergency event may prompt the local agent device 106 to immediately contact the remote surveillance server 118 to immediately contact the authorities, for example, through the remote security alarm center 124.

In order to program the local agent device 106, an individual enters information regarding various events and action procedures for each event. For example, an individual first defines the nature of standard, alarm, and emergency events. For example, a standard event for the video monitoring sub-system may be detecting motion at an entrance of an office at the monitored location 102 during normal business hours. A standard event for a business sub-system 110 may be normal operation. A standard event for a card access sub-system 112 may be a card swipe at normal business hours.

After the standard events are defined, action procedures may then be set for the standard events. For example, a procedure may indicate that the local agent device 106 refrains from any actions based on a standard event. Optionally, the procedure may indicate that the local agent device 106 performs a standard action or task based on the standard event. For example, the local agent device 106 may keep track of the number of card access swipes during normal hours and save the number in the memory 144 and transfer complied data into the database 146 at the end of the day. Alternatively, standard events may not be defined, if no action is to be taken in response to a standard event.

After the alarm events or alerts are defined, procedures may then be set for the alarm events. For example, an alarm event may include attempted or granted card access after normal business hours, or attempted or granted card access by a tracked individual. When such an alarm event is triggered, the alarm procedure may prompt the local agent device 106 to send an immediate email to a manager or supervisor at the monitored location 102 as to the nature of the card access, including date, time, and identity. The procedure may also activate a camera proximate the location of the card access device to obtain a picture of the area when the card access device was engaged. The local agent device 106 may then store an incident report in the database 146. The incident report may be generated and stored at the local agent device 106 and/or sent to the surveillance server 118 when the event occurs, or when the event is resolved. The incident report may include a detailed time-stamped log of the event, actions taken, and result of the event. The incident report may be emailed to the business owner.

Similarly, after an emergency event is defined, an emergency procedure may then be defined and programmed into the local agent device 106. For example, one type of emergency may be a door opened after hours without a card access device being engaged. The local agent device 106 may be in communication with a security system that detects when doors are opened or broken, or when there is movement within a facility. In such a scenario, the procedure may prompt the local agent device 106 to immediately contact the surveillance server 118, which may include the remote security alarm center 124, which may contact the authorities.

Overall, an almost infinite number of events may be defined, and procedures may be correlated with the events, for any type of business or home. The local agent device 106 operates according to the various procedures correlated to the defined events. Thus, the local agent device 106 may automatically perform tasks based on defined events with or without alerting the surveillance server 118. In this manner, the local agent device 106 may be integrated into an existing business or home infrastructure and automatically act according to various procedures. Therefore, a business or home owner does not need to hire a staff to monitor premises around the clock. Moreover, the local agent device 106 may be a small form factor server that may be located within an administrator's office. Therefore, embodiments provide a simpler and less expensive monitoring system than previously-known systems.

Figure 4:
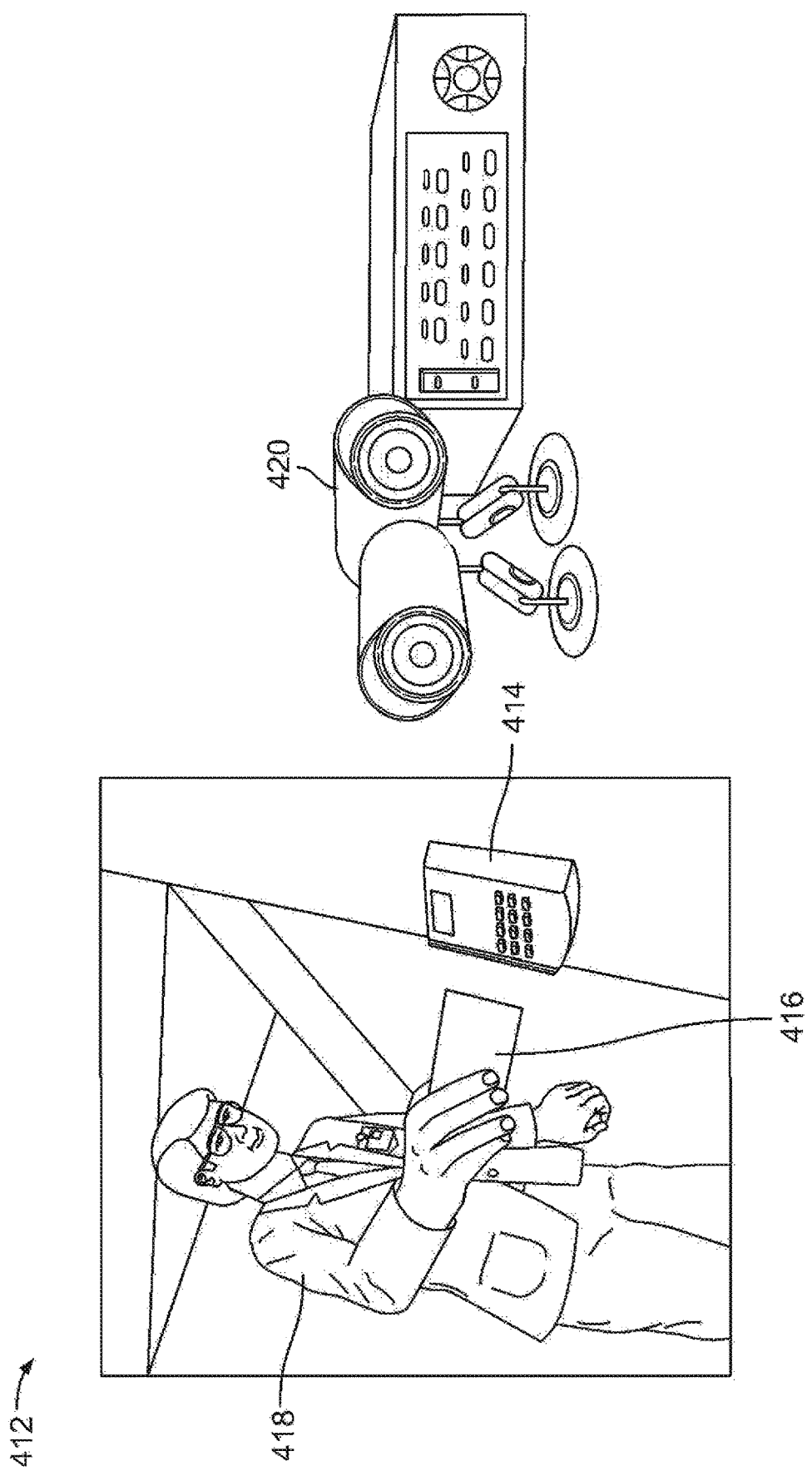
FIG. 4 illustrates a simplified card access sub-system, according to an embodiment.

FIG. 4 illustrates a simplified card access sub-system 412, according to an embodiment. The card access sub-system 412 includes a proximity sensor 414 configured to detect the presence of an access card 416 of an individual 418. A camera 420 may also be near the proximity sensor 414 and configured to have a viewing area that encompasses an area that surrounds the proximity sensor 414, and which is large enough to view the individual 418.

Referring to FIGS. 1-4, if the individual 418 swipes the card 416 relative to the proximity sensor 414 during normal business hours, the local agent device 106 may detect that as a normal or standard event, and take no further action. Optionally, the local agent device 106 may compile the number of card swipes of the individual 418 during a particular day and save the data in the memory 144 and/or the database 146.

However, the local agent device 106 may also be programmed to recognize an alarm event. An example of an alarm event may be that the proximity sensor 414 is engaged after normal business hours. In this event, a stored alarm procedure of the local agent device 106 may cause the local agent device 106 to send a signal to activate the camera 420 to take a picture or video of the individual 418 and store the picture or video in the database 146 along with time of access. Additionally, the stored alarm procedure may cause the local agent device 106 to send an email to the manager of the monitored location 102. The manager may view the email the next day and access the stored data in the database 146. Again, a business owner or office manager, for example, may define each alarm event, and determine and set an action procedure that is associated with each alarm event.

The individual 418 may be flagged as a security risk, however. If a security risk, the individual 418 may still have the access card 416, despite not being further employed, for example, at the monitored location 102. That is, the individual 418 may have kept the access card 416 without authorization. Therefore, if the access card sub-system 412 detects that a security risk is attempting to gain access to the monitored location 102, the access card sub-system 412 may send an emergency alarm to the local agent device 106, which may then act according to an action procedure, which includes actions listed for the alarm event noted above, and also immediately sending an emergency alarm to the surveillance server 118, which then contacts the authorities, such as the police (based on a previously configured action response plan).

Again, events, such as standard, alarm, and emergency events, are defined by a business owner of office manager, for example, and programmed into the local agent device 106. Action procedures are also defined and programmed into the local agent device 106. Each event is correlated with a specific action procedure. The local agent device 106 acts in accordance with the action procedures based on detected events. The local agent device 106 automatically acts and performs tasks at the monitored location with respect to various events. In an embodiment, the local agent device 106 performs all tasks at the monitored location 102, with the possible exception of emergency events, which may be handled by the surveillance server 118, which is at the remote monitoring center 104.

Additionally, the local agent device 106 or a computing device in communication with the local agent device 106, may include facial recognition software. Thus, when an individual swipes his/her card in proximity to the proximity sensor 414, the local agent device 106 may compare the individual information associated with the card with stored facial data. If the information of the card and the facial data match, then the local agent device 106 takes no further action. If, however, the information of the card and the stored facial data do not match, the local agent device 106 may operate according to an alarm and/or emergency procedure, as defined by a business owner or office manager.

Figure 5:
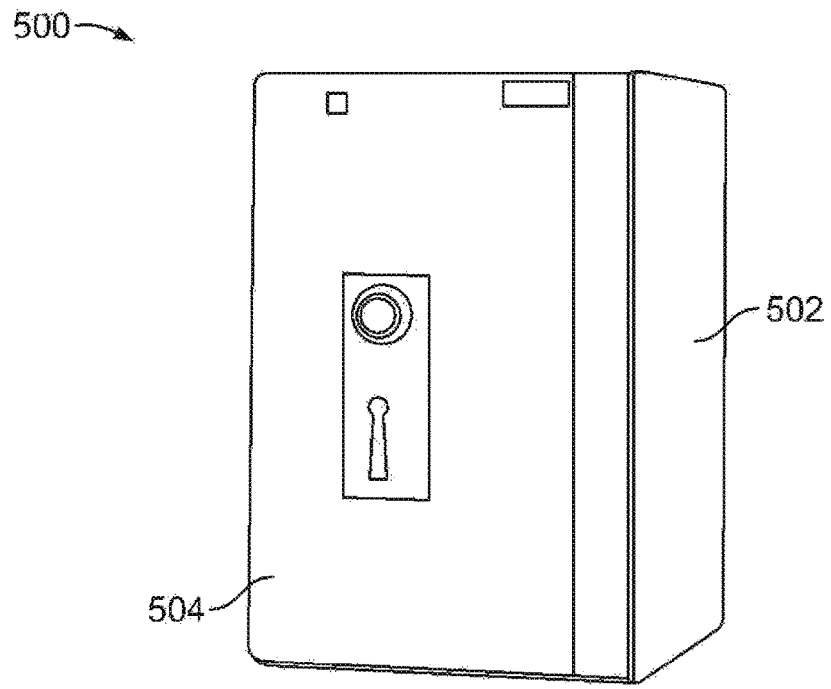
FIG. 5 illustrates an isometric view of a storage container, according to an embodiment.

FIG. 5 illustrates an isometric view of a storage container 500, according to an embodiment. The storage container 500 may be a safe, freezer, drug cabinet, or the like. The storage container 500 may be a business sub-system 110 in communication with the local agent device 106. Optionally, the local agent device 106 may be operatively connected to a camera that monitors the storage container 500.

The storage container 500 includes a main housing 502 and a door 504 pivotally connected to the main housing 502. The door 504 may be opened to gain access to an interior chamber of the storage container 500.

In operation, events may be defined with respect to the storage container 500. For example, an alarm event may be defined as the storage container 500 being opened during normal business hours. The procedure may include the local agent device 106 sending an email to a manager or supervisor at the monitored location that the storage container 500 has been opened. Optionally, the local agent device 106 may activate a telephone system at the monitored location 102 to call the manager or supervisor with an automated message that the storage container 500 has been opened. Whether through email, instant messaging, telephone, or the like, the on-site manager or supervisor may then decide if further action is required. The alarm procedure for such an alarm event may not prompt the local agent device 106 to contact the surveillance server 118.

However, an emergency event may be defined as the storage container 500 being opened after business hours. The emergency procedure may include the local agent device 106 operating according to the alarm procedure noted above, and also immediately contacting the surveillance server 118. Monitoring personnel at the monitoring subsystem 122 may view the emergency alert received at the surveillance server 118 and act accordingly.

Figure 6:
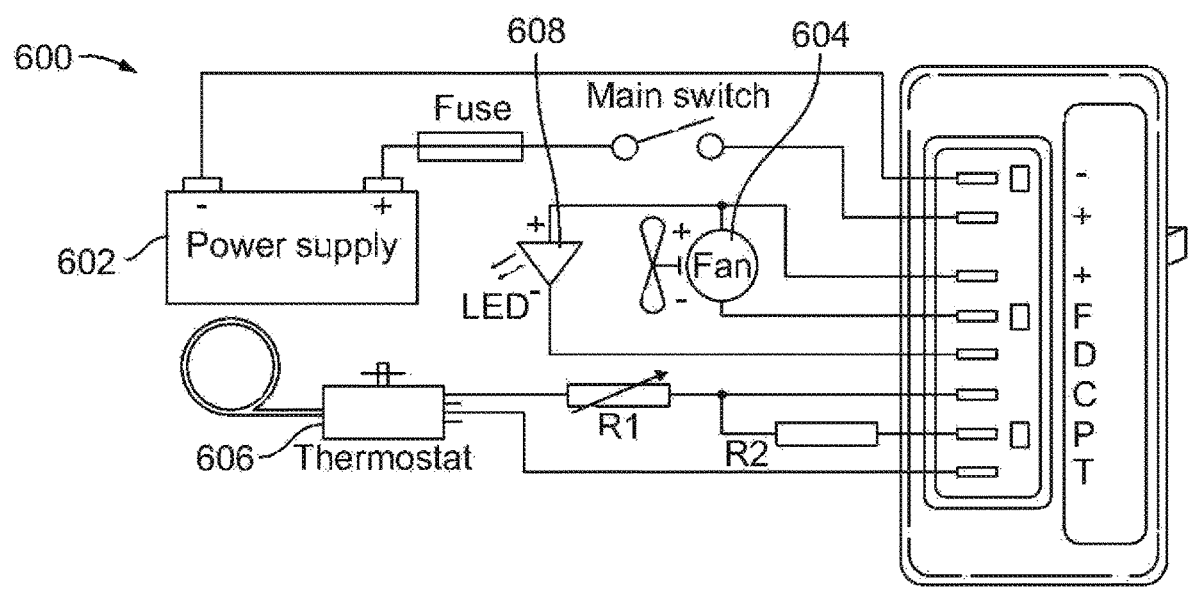
FIG. 6 illustrates a circuit diagram of a business device, according to an embodiment.

FIG. 6 illustrates a circuit diagram of a business device 600, according to an embodiment. The device 600 may be a temperature-controlled drug cabinet, such as used at a medical facility, for example. The device 600 may include a power supply 602, such as a battery, a fan 604, a thermostat 606, and a light emitting diode (LED) 608. The power supply 602 operates the fan 604 to cool the interior of the cabinet. The thermostat 606 monitors the temperature within the cabinet.

If the cabinet temperature is normal, the LED 608 may remain off, for example. If the cabinet temperature varies from an ideal temperature, but is not at a potentially dangerous level, the LED 608 may flash once every 10 seconds, for example. If the cabinet temperature enters a danger zone, the LED 608 may continually flash every second, for example.

An individual may define events and procedures with respect to temperature levels within the cabinet. A camera that is in communication with the local agent device 106 may be focused on the LED 608. If, for example, the local agent device 106 detects, through the camera, the single flashing light every 10 seconds, the local agent device 106 may follow a procedure that sends an email to an on-site manager that may instruct the manager to check the cabinet. If, however, the local agent device 106 detects that the LED 608 flashes continuously every second, the local agent device 106 may contact the surveillance server 118 to immediately contact a technician to set up an immediate appointment to repair the cabinet.

Instead of the LED 608, the business device 600 may include various other visual indicators that may be captured by a camera, sent to the local device agent 106, and recognized through the processor 142 within the local device agent 106. For example, instead of an LED 608, the business device 600 may include an infrared light emitter, and the camera may be an infrared light detector. Additionally, the visual cue may be a mechanical indicator, such as a changing dial, or the like. In short, the business device 600 may be any device used in a business, and the indicator may be any type of visual indicator on the device. The processor 142 of the local agent device 106 may be programmed to recognize the changing visual cues, through the camera, or other such device, to signal a particular event.

Optionally, the local agent device 106 may be in direct communication with the business device 600. For example, the local agent device 106 may directly communicate with the business device 600 through a wired or wireless connection. The processor 142 of the local agent device 106 may directly receive event indications from the business device 600 without the need for the camera.

Overall, embodiments may be used with various business sub-systems, alarm systems, and the like. Individual business owners may define various events as standard events, alarm events, emergency events, and the like, and correlate action procedures with respect to the alarm events, emergency events, and the like. For example, alarm events may be correlated with alarm procedures in which the local agent device 106 performs all actions locally, such as prompting an on-site email or telephone system to contact certain personnel, thereby resolving events locally. Emergency events may be correlated with emergency procedures in which the remote surveillance server 118 at the monitoring center 104 is contacted and personnel monitoring the surveillance server 118 act according to the emergency procedure. Again, a business owner can tailor the events and procedures to his/her particular needs.

As another example, the business sub-systems 110 may include medical imaging devices, for example. Each medical imaging device may be in communication with the local agent device 106. A medical imaging device may periodically send a diagnostic report to the local imaging agent 106. The local agent device 106 may be programmed to recognize diagnostic problems with the medical imaging device. For example, the medical imaging device may be an MRI machine. The diagnostic report for the MRI machine may indicate that it has been on for a period of time that has been defined by a physician as excessively long. In this scenario, the local agent device 106 may send an email to a manager or supervisor at the monitored location 102 that the MRI machine should be deactivated.

However, various emergency events may be defined with respect to the MRI machine. For example, the diagnostic report may indicate that the detector of the MRI machine is malfunctioning. In such an emergency event, the local agent device 106 may be programmed to follow a procedure in which a repair request is sent to the surveillance server 118. Personnel at the monitoring center 104 may then schedule a repair for the MRI machine.

As another example, the business device may be a printer. An alarm event may be low or no ink and/or toner in the printer. When the local agent device 106 detects such an alarm, the local agent device 106 may send an email to the on-site manager that the printer is low on ink and/or toner. If, however, the local agent device 106 detects an emergency event, such as that the printer is incapable of printing, the local agent device 106 sends an emergency signal to the surveillance server 118 indicating that repair is needed. Personnel at the monitoring center 104 may then contact a repair service for the printer.

The examples of business and home sub-systems are not limited to those discussed above. The embodiments may be used with respect to any business or home and with respect to any business or home sub-systems. Again, a business owner may define various events with respect to various business sub-systems, alarm sub-systems, video sub-systems, card access sub-systems, and the like. The business owner may then define procedures for each event. The procedures may include standard, alarm, and emergency procedures. The local agent device 106 may handle all standard and alarm events or alerts locally at the monitored location 102. The local agent device 106 may contact the surveillance server 118 during an emergency event or alert. Personnel at the monitoring center 104 may then take appropriate action based on the emergency event or alert.

Additionally, embodiments are not limited to businesses. The monitored location 102 may be a home, and the business sub-systems 110 may be home sub-systems. The home sub-systems may include appliances, heating and air conditioning systems, home computers, and the like. The local agent device 106 may be in communication with the home sub-systems and alarm systems within the home. For example, the local agent device 106 may be in communication with a refrigerator. If the temperature of the refrigerator is too low, the local agent device 106 may send an email to the home owner informing the homeowner to check the refrigerator settings. If, however, the local agent detects that the motor of the refrigerator is malfunctioning, the local agent device 106 may contact the surveillance server 118 and indicate that a repair should be scheduled. Personnel at the monitoring center 104 may view the message and contact a repair service. Again, the local agent device 106 may be in communication with, or configured to monitor, any and all home appliances, heating and cooling systems, and the like.

In general, the local agent device 106 is configured to respond to and resolve standard issues with respect to the sub-systems 108, 110, and 112. A standard issue may be, for example, a standard maintenance issue with respect to a business sub-system 110 that may be remedied on site without the need for a repair service. For example, a standard issue may be replacing ink or toner within a printer, re-connecting an electronic device to a source of power (for example, the local agent device 106 detects that no power is being delivered to a device, and prompts an on-site manager to check to make sure the device is plugged in), replacing a digital storage medium in a medical imaging device, and the like. The local agent device 106 may respond to and resolve standard issues associated with alarm events by emailing or telephoning (with an automated message) an on-site manager, administrator, or the like. The local agent 106 sends alert messages to the surveillance server 118 at the monitoring center 104 with respect to emergency issues prompted by emergency events. Examples of emergency issues include a security breach before or after normal business hours, a non-functioning internal processor of a business or home device, such as a printer, fax machine, refrigerator, or the like. In short, emergency issues may be those issues prompted by emergency events that on-site personnel are ill- or un-equipped to handle. When an emergency issue arises, an emergency alert is communicated from the local agent device 106 to the surveillance server 118, and personnel at the monitoring center 104 act according to an action response plan. The action response plan may be pre-defined and pre-set by a business or home owner, office manager or administrator, or the like. For example, the action response plan may be created, modified, and saved at the management sub-system 120 at the monitoring center 104. Optionally, the action response plan may be created, modified, and saved at the monitored location 102, and sent to the monitoring center 104 through the local agent device 106.

Referring again to FIGS. 1-3, the web server 123 may be used to gain access to incident reports, emails, phone and email data, and the like that are stored in the database 146 of the local agent device 106. During each event, whether standard, alarm, or emergency, the local agent device 106 may store a report of the event within the database 146. For example, the local agent device 106 may generate a report that at a particular data and time, a home or business sub-system 110 malfunctioned, an individual gained access to the premises after hours, and the like. Each incident report may be stored within the database. A homeowner, manager or supervisor at the monitored location 102 may gain access to the local agent device 106 directly through an on-site computer, for example, to review each incident report. Additionally, personnel at the monitoring center 104 may gain access to the incident reports through the internet and/or the web server 123. The incident reports may be periodically sent to the monitoring center 104 through the internet 114 and/or the web server 123 for long term storage. As such, the incident reports at the local agent device 106 may be deleted after they are transferred to the monitoring center 104.

As noted above, the local agent device 106 may communicate with the monitoring center 104 through a communication system, such as the internet 114. Optionally, the local agent deice 106 may communicate with the monitoring center 104 (and/or with the sub-systems) through various other communication systems such as a voice over IP (VoIP) gateway, a local plain old telephone service (POTS) such as a public switched telephone network (PSTN), a cellular phone based network, and the like. Alternatively, the communication system may be a local area network (LAN), a campus area network (CAN), a metropolitan area network (MAN), a wide area network (WAN), or a wireless local area network (WLAN). The communication system serves to provide a network that facilitates the transfer/receipt of information such as event data, action procedure data, incident reports, and the like.

The local device agent 106 may wirelessly communicate with the sub-systems and utilize procedures, such as Bluetooth, GSM, infrared wireless LANs, HIPERLAN, 3G, satellite, as well as circuit and packet data procedures, and the like. Alternatively, a hard-wired connection may be used to connect the local agent device to the sub-systems.

Figure 7:
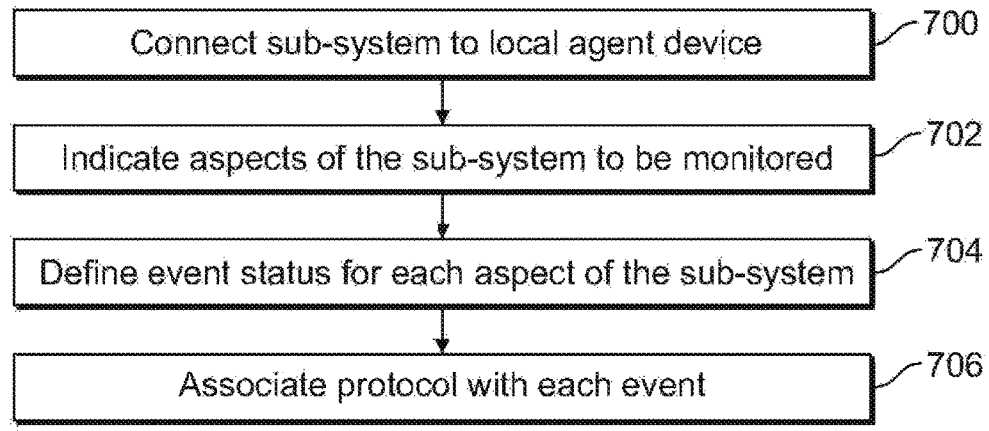
FIG. 7 illustrates a flow chart of a method of programming a local agent device, according to an embodiment.

FIG. 7 illustrates a flow chart of a method of programming a local agent device, according to an embodiment. At 700, the local agent device is communicatively connected to a sub-system, such as a business sub-system or a home sub-system. The local agent device may communicate with the sub-system through a wired or wireless connection. Optionally, the local agent device may be in communication with a central computer system that is in communication with the sub-system.

After the local agent device is communicatively connected to the sub-system, an individual, such as a business or home owner at the monitored location, or an administrator at the monitoring center, is prompted by the local agent device to indicate aspects to the sub-system to be monitored. The sub-system may be pre-programmed to automatically provide a list of functions, aspects, and the like that may be monitored. Optionally, the individual may define functions and aspects that are detected by the sub-system and which may be relayed to the local agent device. At 702, the individual indicates the aspects, functions, and the like of the sub-system that are to be monitored.

At 704, the local agent device prompts the individual to define event status for each aspect to the sub-system. For example, an individual may indicate the range of normal operation. The individual may then indicate alarm and emergency events for each aspect or function that is to be monitored.

Next, the local agent device prompts the individual to enter procedures for each particular event, and the procedures are associated and correlated with each event at 706. For example, the local agent device may provide a list of options for each event. The list of options may include emailing or telephone an individual (defined by the programming individual), generating a report, contacting the monitoring center, sounding an alarm at the monitored location, and the like. The potential procedures are wide-ranging for an almost infinite number of applications for various business and home sub-systems, including alarm and monitoring sub-systems. Accordingly, the examples discussed above are not exhaustive.

Figure 8:
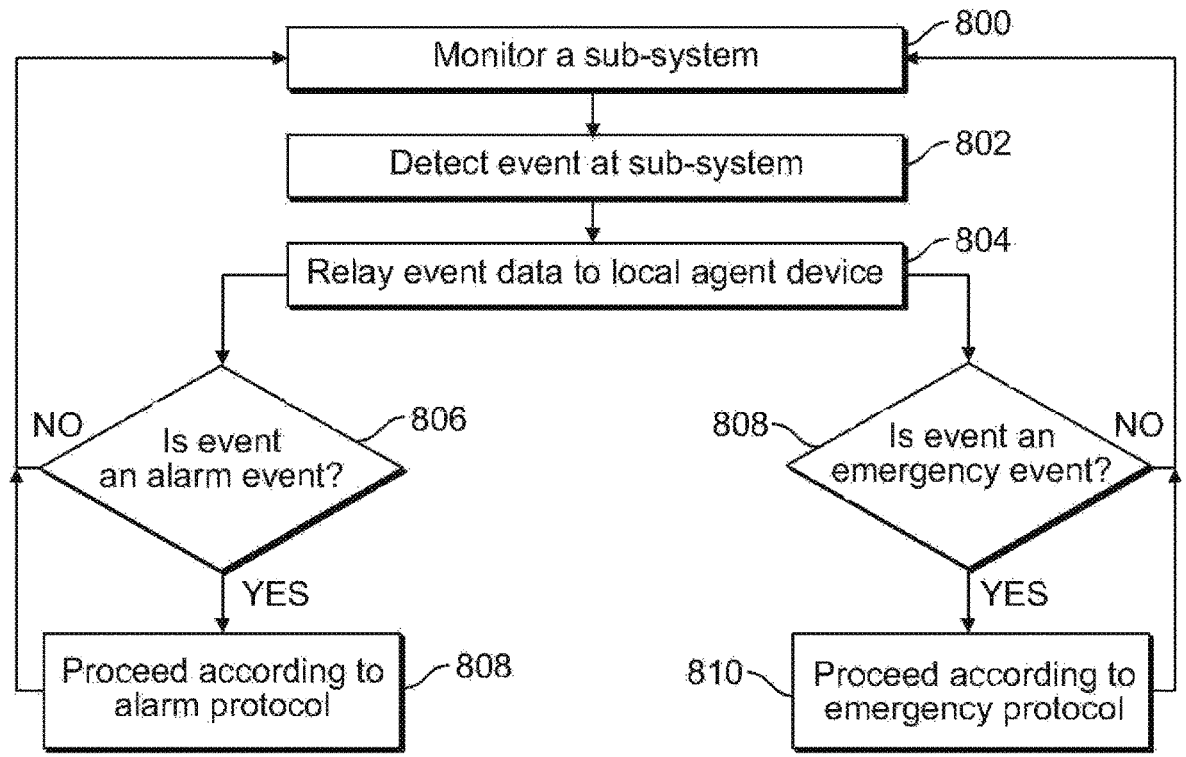
FIG. 8 illustrates a flow chart of a method of operating a local agent device, according to an embodiment.

FIG. 8 illustrates a flow chart of a method of operating a local agent device, according to an embodiment. At 800, a sub-system, such as a business device (for example, a medical imaging device, a freezer, a heating system, an air-conditioner, etc.) a home device (for example, an appliance, a home heating system, air-conditioner, etc.), security cameras, an alarm system, or the like is monitored by the local agent device at the monitored premise. Next, at 802, an event is detected at the sub-system. The event may be a device malfunction, after-hours access, or a host of various other events.

At 804, the event data is relayed to the local agent device. At 806, the local agent device determines if the event is an alarm event, as defined and stored within the local agent device. If not, the process returns to 800. If the event is an alarm event, then at 808, the local agent device proceeds according to a pre-programmed alarm procedure, which may include emailing or telephoning an individual at the monitored location.

At 808, the local agent device determines if the event is an emergency event, as defined and stored within the local agent device. If the event is not an emergency event, the process returns to 800. If, however, the event is an emergency event, the local agent device proceeds according to a pre-programmed emergency procedure. For example, the local agent device may send an emergency signal to a surveillance server at a monitoring center. Personnel at the monitoring center may then receive the emergency message and contact an individual entity that can rectify the emergency, such as local police, a repair service, or the like.

During or after the event, an incident report may be stored at the local agent device and/or at the monitoring center. The incident report may include a detailed time-stamped log of the event, actions taken, and result of the event. The incident report may be emailed to the business owner by the local agent device or the monitoring center. Personnel at the monitoring center may gain access to stored incident reports within the local agent device through a web server, for example.

Embodiments provide a local agent device that automatically responds to and resolves select alarms, alerts, and the like, as defined by a business or home owner. Such events include an offline access control panel, an AC power loss, low printer ink or toner, or the like, which during normal business hours are best handled locally on-site. The local agent device sends pre-defined specified emergency alerts or alarms to a remote monitoring center, where expert personnel follow a pre-determined action response plan. Upon conclusion of the incident, an incident report may be generated and sent to the business owner and/or others specified by the business owner, office administrator, or the like.

Thus, embodiments of the present invention provide a monitoring system and method that may deal with most events locally, as opposed to contacting a remote monitoring center. Embodiments provide a local agent device that reacts to events and acts according to pre-programmed procedures that allow the local agent device to react to the non-emergency events automatically at the monitored location. When an actual emergency is detected, the local agent device reacts according to an action response plan having a pre-programmed emergency procedure and alerts the remote monitoring center. Personnel at the remote monitoring center may then review the emergency message transmitted from the local agent device and respond accordingly.

Thus, embodiments provide an efficient system and method for dealing with alarms and emergencies within a business or home. Embodiments provide a system and method that allow a business or home owner to constantly monitor a location without the need to expend resources hiring staff to monitor the premises. Additionally, certain embodiments provide a small form factor local agent device, such as a server, that may be quickly, easily, and unobtrusively integrated into and with existing infrastructure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A system for monitoring a location, comprising:
a local server at the location, wherein the local server comprises a hardware control block having a hardware processor in communication with a hardware memory, wherein the local server comprises a housing configured to be positioned on or underneath a desk at the location; and
a security system at the location and in communication with the local server, wherein the security system is monitored with the local server, wherein the security system comprises a video monitoring sub-system and a card access sub-system,
wherein the local server is configured to identify an event occurring within the security system within normal business hours as a standard event and respond to the standard event by automatically performing a standard task at the location without contacting a surveillance server of a monitoring center that is remote from the location, wherein the standard event is a detected motion and a card swipe at an entrance of an office at the monitored location during the normal business hours, wherein the standard task comprises the local server sending an email to an individual associated with the location,
wherein the local server is configured to identify an attempted card access within the security system by a tracked individual after the normal business hours as an alarm event and respond to the alarm event by automatically performing an alarm task of activating a camera proximate to the location of a card access device to obtain a picture of an area while the card access device is engaged at the location and contacting via an email the individual associated with the location, wherein the email including date and time of the attempted card access and identity of the tracked individual,
wherein the local server is configured to identify an entrance opened within the security system after hours without the card access device being engaged as an emergency event and respond to the emergency event by performing an emergency task including contacting emergency personnel through the surveillance server, wherein the emergency task comprises the local server sending an email to the individual associated with the location, and
wherein the standard event, the standard task, the alarm event, the alarm task, the emergency event, and the emergency task are defined by the individual associated with the location and programmed into the local server.

2. The system of claim 1, wherein the security system further comprises one or more of a business sub-system or a home sub-system.

3. The system of claim 1, wherein the local server generates an incident report of one or more of the standard event, the alarm event, or the emergency event, and wherein the local server sends the incident report to the individual associated with the location.

4. The system of claim 1, wherein the local server further comprises a database, wherein the standard task, the alarm task, and the emergency task are stored in the memory, and wherein the hardware processor is configured to store incident reports in the database.

5. A system for monitoring a location, comprising:
a security system at the location;
a local server at the location and in communication with the security system, wherein the local server comprises a hardware control block having a hardware processor in communication with a hardware memory, wherein the local server comprises a housing configured to be positioned on or underneath a desk at the location; and
a monitoring center that is remote from the location, wherein the security system is monitored with the local server, wherein the security system comprises a video monitoring sub-system and a card access sub-system,
wherein the local server is configured to identify an event occurring within the security system within normal business hours as a standard event and respond to the standard event by automatically performing a standard task at the location without contacting a surveillance server of the monitoring center, wherein the standard event is a detected motion and a card swipe at an entrance of an office at the monitored location during the normal business hours, wherein the standard task comprises the local server sending an email to an individual associated with the location,
wherein the local server is configured to identify an attempted card access within the security system by a tracked individual after the normal business hours as an alarm event and respond to the alarm event by automatically performing an alarm task of activating a camera proximate to the location of a card access device to obtain a picture of an area while the card access device is engaged at the location and contacting via an email the individual associated with the location, wherein the email including date and time of the attempted card access and identity of the tracked individual,
wherein the local server is configured to identify an entrance opened within the security system after hours without the card access device being engaged as an emergency event and respond to the emergency event by performing an emergency task including contacting emergency personnel through the surveillance server, wherein the emergency task comprises the local server sending an email to the individual associated with the location, and
wherein the standard event, the standard task, the alarm event, the alarm task, the emergency event, and the emergency task are defined by the individual associated with the location and programmed into the local server.

6. The system of claim 5, wherein the security system further comprises one or more of a business sub-system or a home sub-system.

7. The system of claim 5, wherein one or both of the local server and the monitoring center generate incident reports of at least one of the standard event, the alarm event, and the emergency event, and wherein one or both of the local server or the monitoring center send the incident reports to the individual associated with the location.

8. The system of claim 5, wherein the local server further comprises a database, wherein the standard event, the standard task, the alarm event, the alarm task, the emergency event, and the emergency task are stored in the hardware memory, and wherein the hardware processor is configured to store incident reports in the database.

9. A method of monitoring a location, comprising:
communicatively connecting a security system at the location to a local server at the location, wherein the local server comprises a hardware control block having a hardware processor in communication with a hardware memory, wherein the local server comprises a housing configured to be positioned on or underneath a desk at the location;
monitoring the security system with the local server, wherein the security system is monitored with the local server, wherein the security system comprises a video monitoring sub-system and a card access sub-system;
identifying, by the local server, an event occurring within the security system within normal business hours as a standard event;
responding, by the local server, to the standard event by automatically performing a standard task at the location without contacting a surveillance server of a monitoring center that is remote from the location, wherein the standard event is a detected motion and a card swipe at an entrance of an office at the monitored location during the normal business hours, wherein the standard task comprises the local server sending an email to an individual associated with the location;
identifying, by the local server, an attempted card access within the security system by a tracked individual after the normal business hours as an alarm event;
responding, by the local server, to the alarm event by automatically performing an alarm task of activating a camera proximate to the location of a card access device to obtain a picture of an area while the card access device is engaged at the location and contacting via an email the individual associated with the location, wherein the email including date and time of the attempted card access and identity of the tracked individual;
identifying, by the local server, an entrance opened within the security system after hours without the card access device being engaged as an emergency event; and
responding, by the local server, to the emergency event by performing an emergency task including contacting emergency personnel through the surveillance server, wherein the emergency task comprises the local server sending an email to the individual associated with the location, and wherein the standard event, the standard task, the alarm event, the alarm task, the emergency event, and the emergency task are defined by the individual associated with the location and programmed into the local server.

10. The method of claim 9, wherein the security system further comprises one or more of a business sub-system or a home sub-system.

11. The method of claim 9, further comprising:
generating an incident report of at least one of the standard event, the alarm event, and the emergency event; and
sending the incident report to the individual associated with the location.

* * * * *